2,830,084

OXIDATION OF NAPHTHENES

William H. Clingman, Jr., Texas City, Tex., assignor to The American Oil Company, Texas City, Tex., a corporation of Texas No Drawing. Application May 29, 1956
Serial No. 587,938

4 Claims. (Cl. 260—533)

This invention concerns a process for oxidizing naphthenes to dibasic acids and in particular it is concerned with improvements in the liquid phase oxidation of naphtheses using nitrogen dioxide and oxygen.

Naphthenes such as cyclohexane can be oxidized to dibasic acids such as adipic acid by using nitrogen dioxide and oxygen as the oxidizing means. If in the oxidation process the reaction system behaved ideally, there would be no net consumption of nitrogen dioxide because as quickly as the $NO_2$ is reduced to NO during the oxidation of the naphthene, it would immediately be oxidized back to $NO_2$ by the oxygen present. However, many side reactions occur which produce $N_2O$, $N_2$ (which are not reoxidized to $NO_2$), and nitro compounds such as nitrated naphthenes etc. Thus, there is a net consumption of $NO_2$ in forming undesired reaction products. In addition the naphthenes are in part degraded to CO and $CO_2$, which results in a reduction in the yield of the dibasic acids produced. A naphthene oxidation process is therefore desired which effects high conversions of naphthene to the dibasic acids and which produces high yields of dibasic acid per unit of nitrogen dioxide consumed and also produces low yields of the degradation products of the naphthene (CO plus $CO_2$) per unit of dibasic acid produced.

An object of this invention is to provide a process for oxidizing naphthenes which enables increased conversion of the naphthene to dibasic acids. Another object is to provide a naphthene oxidation process of improved selectivity, i. e., a process capable of producing improved yields of dibasic acid per unit of nitrogen dioxide consumed. A further object of this invention is to provide a method for reducing the extent of degradation of the naphthenes in the oxidation of the latter to dibasic acids. These and other objects and advantages of the present invention will be apparent from the detailed description of the invention.

It has been found that when naphthenes are oxidized in the liquid phase to dibasic acids using nitrogen dioxide and oxygen as the oxidizing means, an increase in the extent of conversion to the dibasic acid and an increase in the selectivity of the conversion to form more dibasic acid per unit of nitrogen dioxide and to form less hydrocarbon degradation products per unit of dibasic acid produced can be attained by carrying out the oxidation in the presence of acetic acid while maintaining certain defined conditions of temperature and partial pressure of oxygen in the reaction zone. These conditions are a temperature of between about 75° C. and 200° C., preferably between about 80 and 100° C., and an oxygen partial pressure of between about 2 and 30 atmospheres, preferably between about 3 and 8 atmospheres. By employing sulfuric acid in conjunction with the acetic acid in the reaction zone, a further increase in the amount of dibasic acid formed per unit of nitrogen dioxide consumed is obtained and a greater percentage of the converted naphthene is dibasic acid.

The oxidation process is carried out by intimately contacting a liquid mixture of the naphthene and between about 0.05 and 10 mols of acetic acid/mol of naphthene with the nitrogen dioxide in a reaction zone which is maintained under the defined partial pressure of oxygen and at the defined temperatures. The amount of nitrogen dioxide generally used is between about 0.05 and 5.0 mols/mol of naphthene, preferably between about 0.1 and 2.0 mols/mol of naphthene. When sulfuric acid is used to increase further the selectivity of the oxidation reaction, it is employed in an amount between about 0.01 and 1.0 mol/mol of naphthene, preferably in an amount between about 0.1 and 0.5 mol of sulfuric acid/mol of naphthene. Peculiarly, it has been found that the sulfuric acid provides no beneficial effect in the oxidation process unless it is used in conjunction with the acetic acid.

The process of this invention will be described principally by referring to the oxidation of tertiary butyl cyclohexane, although it should be understood that it is applicable to other naphthenes such as cycloalkanes having from 4 to 6 carbon atoms, inclusive, in the ring and to their methyl-, ethyl-, propyl-, or butyl-substitution products. It will also be apparent that the process of the present invention is not limited to the use of substantially pure naphthenes, but may be applied to natural or synthetic naphthene-containing fractions, such as fractions derived from petroleum or from synthesized products derived from petroleum fractions.

As has been indicated, a wide range of concentrations of $NO_2$ may be used in the process. This range, generally between about 0.05 and 5.0, preferably between about 0.1 and 2.0 mols of $NO_2$/mol of naphthene, affects the conversion importantly. The higher the concentration of $NO_2$ employed, the greater is the conversion of the naphthene to the alkane dicarboxylic acids. When using the higher ratios of $NO_2$/naphthene, it is preferred to employ the higher ratios of acetic acid/naphthene to avoid any possibility of explosive reactions. The use of other diluents such as carbon tetrachloride, or the use of a two-phase liquid reaction system in which the liquid $NO_2$ is dissolved in part in the naphthene and in part in the acetic acid following which a small amount of water is added to bring about phase separation are also useful safeguards.

In order to obtain the advantages which accrue from the use of acetic acid in the reaction zone, it is essential that the oxidation process be carried out while maintaining a partial pressure of oxygen in the reaction zone of between about 2 and 30 atmospheres, preferably between about 3 and 8 atmospheres. When the oxygen partial pressure in the reaction zone is 2 atmospheres, the use of the acetic acid results in an increase in the extent of conversion of the naphthene to the dibasic acid and also results in a reduction in the extent of degradation of the naphthene, as measured by the amount of CO plus $CO_2$ produced per unit of dibasic acid. As the oxygen partial pressure is increased to about 4 atmospheres, the use of the acetic acid results in an additional benefit, namely, the amount of dibasic acid produced per unit of nitrogen dioxide reacted is increased. This indicates that less of the nitrogen dioxide is being consumed in the formation of $N_2O$, $N_2$, and nitrated hydrocarbons. With an increase in the partial pressure of oxygen, an increase is observed in that portion of converted naphthene which is converted to the dibasic acids and the reaction is thus made more selective. At an oxygen partial pressure of approximately 30 atmospheres, the beneficial effects of using acetic acid largely disappear.

The reaction rate is temperature dependent, i. e., the rate of oxidation of the naphthene increases with increasing temperature. However, when the oxidation process is carried out in the absence of acetic acid, the yield of dibasic acid per unit of nitrogen dioxide consumed decreases as the temperature is increased. This disadvantage of a loss in the selective use of the nitrogen dioxide is minimized when acetic acid is employed in the reaction zone. It is essential to employ a temperature not less than about 75° and generally not more than about 200° C. in carrying out the oxidation process in order to obtain the advantages which accrue from the use of acetic acid. Preferred temperatures are from about 80° to 100° C. When operating the process within the defined temperature ranges, use of the acetic acid results in an increase in the amount of naphthene converted to the dibasic acid, an increase in the selectivity of the oxidation of the naphthene to the dibasic acid by the $NO_2$ (as measured by the mols of dibasic acid formed per mol of $NO_2$ reacted), and a decrease in the extent of degradation of the naphthene (as measured by the mols of $CO$ plus $CO_2$ formed per mol of dibasic acid produced). None of these advantages occurs when using a lower reaction temperature such as 60° C., and in fact the use of acetic acid at such a temperature worsens the oxidation process with respect to each of the above three criteria.

Because the reaction rate is temperature dependent, the reaction time encompasses a wide range. It may be from 0.1 to 50 hours, for example, from about 0.5 to 5 hours, the higher the temperature the less the reaction time necessary to produce a given yield of the alkane dicarboxylic acid.

The acetic acid is employed in an amount between about 0.05 and 10, preferably between about 0.1 and 1.0 mol per mol of naphthene. Concentrated acetic acid of 90–100% concentration is preferably employed although dilute solutions thereof may be used as well as acetic anhydride or mixtures of the latter with acetic acid. The presence of water in reaction mixture renders the oxidation process less selective however.

The sulfuric acid, which may be employed in conjunction with the acetic acid to increase the selectivity of oxidation is preferably concentrated sulfuric acid such as contains between 90 and 100 percent $H_2SO_4$. While the more dilute sulfuric acid solutions may be used, the water therein reduces somewhat the benefits obtainable. When using the sulfuric acid together with the acetic acid, it should be employed in an amount between about 0.1 and 1.0 mol per mol of naphthene, preferably between about 0.1 and 0.5 mol per mol of naphthene. The use of sulfuric acid increases the mols of dibasic acid formed per mol of nitrogen dioxide consumed and also increases the percentage of converted naphthene which is converted to dibasic acids. Surprisingly, it has been found that unless the sulfuric acid is used together with the acetic acid it contributes no beneficial effect and is actually harmful in that a lesser amount of dibasic acid is formed per unit of nitrogen dioxide consumed.

A number of experiments were carried out which are related to the present invention. In a typical run (run No. 4) 111 grams of tertiary butyl cyclohexane and 11.2 grams of acetic acid were mixed and chilled in an ice bath. Nitrogen dioxide was separately chilled in an ice bath. Immediately prior to charging the reactants to the reactor, the liquid nitrogen dioxide was added to the naphthene in acetic acid mixture. Thereafter the mixture was charged to an evacuated one-liter stainless steel stirred autoclave. The initial temperature of the autoclave was approximately 30° C. In order to facilitate the gas analysis argon was added to the autoclave until the gage pressure was 30 p. s. i. g. and then oxygen was added to the partial pressure of oxygen used. The reactor was immersed in a constant temperature bath and the temperature of the reactor was raised from 30° C. to the operating temperature over the course of about one-half hour. The reaction mixture was maintained at this temperature while continuous agitation was applied over the course of the reaction time. At the end of this time approximately 100 cc. of water were pressured into the autoclave to quench the reaction.

A gas sample was taken from the autoclave and cooled in a Dry Ice-kerosene slush (approximately −50° C.) to remove organic material, nitrogen dioxide, or water present in the gas sample. The remainder of the gas was analyzed by mass spectograph to determine the percentage of argon, carbon monoxide, and carbon dioxide.

The liquid portion of the product in the autoclave was cooled. It consisted of an aqueous phase and an organic phase. Dibasic acid, acetic acid, and nitrogen dioxide were washed out of the organic phase with water, the washings being combined with the aqueous phase from the autoclave. Portions of this aqueous solution were then analyzed for nitrogen dioxide and dibasic acids. The number of mols of dibasic acid were determined by first evaporating the acetic acid and water and then redissolving the residue in water. The silver salt of the dibasic acids was precipitated from a neutral solution, washed with isopropanol, and dissolved in 1 N $HNO_3$. The resulting $AgNO_3$ solution was analyzed for $Ag^+$ by precipitating and weighing $AgCl$. For some of the runs, the $Ag^+$ was determined by volumetrically precipitating $AgCl$. The $NO_2$ was determined by titrating the total acid present and correcting for the dibasic acid and acetic acid.

The experiments which were performed indicate the advantage to be obtained by using acetic acid in the oxidation process under the proper conditions of temperature and oxygen partial pressure. The results obtained in these experiments are shown in Table I which follows:

*Table I*

| Run No. | Mols $NO_2$/mol naphthene | Time (hrs.) | Temp. (° C.) | Oxygen partial pressure (atm.) | Mols acetic acid/mol naphthene | Mols dibasic acid/mol $NO_2$ reacted | Mols $CO+CO_2$/ mol dibasic acid produced | Conversion of naphthene to dibasic acid, mol percent |
|---|---|---|---|---|---|---|---|---|
| 1 | 0.13 | 17.5 | 78 | 2 | 0 | 0.10 | 1.7 | 1.01 |
| 2 | 0.12 | 17.5 | 76 | 2 | 0.24 | 0.10 | 1.2 | 1.20 |
| 3 | 0.12 | 17 | 78 | 4 | 0 | 0.12 | 1.8 | 1.27 |
| 4 | 0.12 | 16.25 | 78 | 4 | 0.24 | 0.20 | 1.0 | 2.46 |
| 5 | 0.12 | 17.5 | 87 | 4 | 0 | 0.11 | 2.6 | 1.16 |
| 6 | 0.13 | 17.5 | 87 | 4 | 0.23 | 0.15 | 1.4 | 1.85 |
| 7 | 0.11 | 17.5 | 79 | 6 | 0 | 0.13 | 5.6 | 1.28 |
| 8 | 0.13 | 17.5 | 79 | 6 | 0.24 | 0.25 | 1.2 | 2.28 |
| 9 | 0.12 | 22.25 | 79 | 8 | 0 | 0.19 |  | 2.21 |
| 10 | 0.12 | 18.5 | 77 | 8 | 0.25 | 0.22 |  | 2.14 |
| 11 | 3.94 | 4.25 | 79 | 23–31 | 8.77 | 0.07 | 2.27 | 13.9 |
| 12 | 0.11 | 17 | 60 | 4 | 0 | 0.19 |  | 1.41 |
| 13 | 0.12 | 16.75 | 60 | 4 | 0.25 | 0.15 |  | 0.97 |
| 14 | 0.12 | 17.5 | 69 | 4 | 0 | 0.17 | 1.4 | 1.78 |
| 15 | 0.12 | 17.5 | 66 | 4 | 0.24 | 0.14 | 1.4 | 1.37 |

By comparing runs No. 1 and 2 with runs No. 3 and 4, it is apparent that an oxygen partial pressure of at least 4 atmospheres is needed in order to imrove the selectivity of use of nitrogen dioxide. At an oxygen partial pressure of 4 atmospheres an increase is obtained in the mols of dibasic acid/mols of $NO_2$ reacted over that obtained at an oxygen partial pressure of 2 atmospheres. However, termined by precipitating and weighting the AgCl. The amount of unreacted naphthene present in the organic phase was determined extracting the intrated compounds into $H_2SO_4$ and weighing the residue of pure naphthene. The results obtained in these experiments, which show the effect of using sulfuric acid in the oxidation process, are shown in Table II which follows:

*Table II*

| Run No. | Mols $NO_2$/mol naphthene | Time (hrs.) | Temp. (°C.) | Oxygen partial pressure (atm.) | Mols dibasic acid/mol $NO_2$ reacted | Conversion of naphthene, mol percent | Dibasic acid/mol percent of converted naphthene | Additives, mols of additive/mol naphthene |
|---|---|---|---|---|---|---|---|---|
| 16 | 0.38 | 3.5 | 75–80 | 5.5–8 | 0.24 | 22 | 28 | None. |
| 17 | 0.39 | 3.5 | 75–80 | 8 | 0.11 | 12 | 28 | 0.035 $H_2SO_4$. |
| 18 | 1.4 | 3.5 | 77 | 5–8 | 0.11 | 57 | 25 | 2.35 acetic acid; 0.17 $H_2O$. |
| 19 | 1.4 | 3.2 | 75 | 5–8 | 0.22 | 32 | 36 | 2.34 acetic acid; 0.19 $H_2O$; 0.075 $H_2SO_4$. |
| 20 | 1.5 | 17.7 | 77 | 6–8 | 0.15 | 52 | 37 | 2.32 acetic acid; 0.575 $H_2O$; 0.293 $H_2SO_4$. |
| 21 | 1.4 | 3.5 | 79 | 4–8 | 0.11 | 37 | 15 | 2.33 acetic acid. |
| 22 | 1.4 | 3.5 | 77–83 | 5–8 | 0.24 | 31 | 48 | 2.31 acetic acid; 0.298 $H_2SO_4$. |
| 23 | 1.4 | 3.5 | 75–81 | 6–8 | 0.20 | 31 | 49 | 2.31 acetic acid; 0.676 $H_2SO_4$. |
| 24 | 1.6 | 3.5 | 74–79 | 15–20 | 0.20 | 34 | 43 | 2.35 acetic acid. |
| 25 | 1.4 | 3.7 | 79 | 17–20 | 0.36 | 29 | 67 | 2.27 acetic acid; 0.30 $H_2SO_4$. | even under the latter conditions an improvement is obtained by the use of the acetic acid in reducing the formation of CO plus $CO_2$/mol of dibasic acid and in increasing the conversion of the naphthene to the dibasic acids. By comparing runs 12 through 15 with runs 3 and 4 it is readily seen that if temperatures of 66° C. and lower are employed, the use of acetic acid has a harfmul effect in that it reduces the extent of conversion of the naphthelene to the dibasic acid, reduces the mols of dibasic acid formed per mol of nitrogen dioxide reacted, and effects no improvement in the mols of CO plus $CO_2$ formed per mol of dibasic acid produced. Thus it is essential in this invention to employ the defined range of temperatures and oxygen partial pressures in the reaction zone. Run 11, in which 31.2 mols of $CCl_4$/mol naphthene was also used as solvent, shows that increasing the $NO_2$ to naphthene ratio increases the conversion of naphthene to dibasic acid but brings about a substantial decrease in mols of dibasic acid formed per mol of $NO_2$ reacted.

Another series of experiments shows the effects obtained when sulfuric acid is employed in the reaction zone. In a typical run (run No. 25) 15.4 grams of 95% $H_2SO_4$, 31.0 grams of liquid $NO_2$, 67.3 grams of glacial acetic acid, and 69.3 grams of tertiary butyl cyclohexane were charged directly to an evacuated 1410 ml. stainless steel rocking bomb. Argon was added to the bomb until the gauge pressure was 30 p. s. i. g. and then oxygen was introduced to the partial pressure of oxygen employed in the particular run. The argon was added to facilitate analysis of the product gases. The reactants were heated to the reaction temperature over a period of about one hour. At the end of the reaction period, the reaction was quenched by pressuring approximately 100 cc. of water into the reactor.

The reaction products were worked up in the manner previously described. The sulfuric acid present in the aqueous solution of dibasic acid, acetic acid, $NO_2$, and $H_2SO_4$, was determined by titrating with $Ba^{++}$. The unreacted $NO_2$ was determined by titrating the total acid present and correcting for the dibasic acid, acetic acid, and sulfuric acid present. The number of mols of dibasic acid were determined by first evaporating the acetic acid and water and then redissolving the residue in water. Sulfate ion was removed by precipitating with $Ba(NO_3)_2$ from a neutral solution. The silver salt of the dibasic acids was then precipitated from a neutral solution, washed with isopropanol, and dissolved in 1 N $HNO_3$. The resulting $AgNO_3$ was analyzed for $Ag^+$ by volumetrically precipitating AgCl. For some of the runs the $Ag^+$ was de- From runs 16 and 17 it is apparent that when sulfuric acid is used without acetic acid it has a harmful effect in that it reduces the mols of dibasic acid formed per mol of nitrogen dioxide reacted and also reduces the amount of conversion of the naphthene. By comparing runs 18, 19, and 20, it can be seen that when using sulfuric acid in conjunction with acetic acid an improvement is obtained in the yield of dibasic acid per mol of nitrogen dioxide reacted and in addition a greater portion of the converted naphthene is converted to dibasic acid. This enables a higher ultimate yield of dibasic acid per unit of naphthene charged.

Thus having described the invention, what is claimed is:

1. In the process of oxidizing naphthenes to dibasic acids wherein liquid naphthene is contacted with nitrogen dioxide and oxygen in a reaction zone, the improvement which comprises effecting said contacting at a temperature between about 75° C. and 200° C. in the presence of acetic acid and at least 0.1 mol of sulfuric acid per mol of naphthene while maintaining an oxygen partial pressure in the reaction zone of between about 2 and 30 atmospheres.

2. The process of claim 1 wherein the naphthene is cyclohexane.

3. The process of claim 1 wherein the naphthene is tertiary butyl cyclohexane.

4. In the process of oxidizing naphthenes to dibasic acids wherein liquid naphthene is contacted with a nitrogen dioxide and oxygen in a reaction zone, the improvement which comprises effecting said contacting at a temperature between about 75° C. and 100° C. in the presence of between about .05 and 10 mols of acetic acid/mol of naphthene and in the presence of between about 0.1 and 1 mol of sulfuric acid/mol of naphthene, while maintaining an oxygen partial pressure in the reaction zone of between about 2 and 30 atmospheres.

References Cited in the file of this patent

UNITED STATES PATENTS

| 2,223,493 | Loder | Dec. 3, 1940 |
| 2,662,908 | Logan | Dec. 15, 1953 |

FOREIGN PATENTS

| 149,974 | Great Britain | Nov. 3, 1921 |
| 691,641 | Great Britain | May 30, 1953 |

OTHER REFERENCES

Groggins: Unit Processes in Organic Synthesis (1952), pp. 433–4.